and a light source device is provided. The LGP includes a plate
United States Patent Wu et al.

(10) Patent No.: US 9,703,032 B2
(45) Date of Patent: Jul. 11, 2017

(54) PLANAR LIGHT SOURCE

(71) Applicants: Jhong-Hao Wu, Hsin-Chu (TW);
Chin-Ku Liu, Hsin-Chu (TW)

(72) Inventors: Jhong-Hao Wu, Hsin-Chu (TW);
Chin-Ku Liu, Hsin-Chu (TW)

(73) Assignee: Young Lighting Technology Inc.,
Hsin-Chu (TW)

( * ) Notice: Subject to any disclaimer, the term of this
patent is extended or adjusted under 35
U.S.C. 154(b) by 242 days.

(21) Appl. No.: 14/297,630

(22) Filed: Jun. 6, 2014

(65) Prior Publication Data

US 2014/0376258 A1  Dec. 25, 2014

(30) Foreign Application Priority Data

Jun. 19, 2013 (CN) .......................... 2013 1 0243997

(51) Int. Cl.
  *F21V 8/00* (2006.01)
(52) U.S. Cl.
  CPC ......... *G02B 6/0055* (2013.01); *G02B 6/0038*
  (2013.01); *G02B 6/0045* (2013.01); *G02B 6/0036* (2013.01)
(58) Field of Classification Search
  CPC ....................................... G02B 6/0033–6/0045
  See application file for complete search history.

(56) References Cited

U.S. PATENT DOCUMENTS

| 5,128,842 A * | 7/1992 | Kenmochi | G02B 6/0061 200/314 |
| 5,420,761 A * | 5/1995 | DuNah | G02B 6/0038 362/330 |
| 5,838,404 A * | 11/1998 | Ozeki | G02B 6/0038 349/57 |
| 6,254,245 B1 | 7/2001 | Uehara | |
| 6,323,919 B1 * | 11/2001 | Yang | G02B 6/0038 349/63 |
| 6,341,872 B1 * | 1/2002 | Goto | G02B 6/0038 362/331 |

(Continued)

FOREIGN PATENT DOCUMENTS

| CN | 1301977 | 7/2001 |
| CN | 1400498 | 3/2003 |

(Continued)

*Primary Examiner* — Andrew Coughlin
*Assistant Examiner* — Colin Cattanach
(74) *Attorney, Agent, or Firm* — Jianq Chyun IP Office

(57) ABSTRACT

A planar light source including a light guide plate (LGP) and a light source device is provided. The LGP includes a plate portion and at least one prism portion. The plate portion has a light incident surface, a reflective surface, a bottom surface, and a light exiting surface. The prism portion is disposed on the bottom surface of the plate portion, and has a first plane and a second plane. An included angle between the first plane and the bottom surface is smaller than an included angle between the second plane and the bottom surface, and a shortest distance between the first plane and the light incident surface is smaller than a shortest distance between the second plane and the light incident surface. The light source device is disposed adjacent to the light incident surface. The disclosure provides planar light source with good light uniformity.

16 Claims, 15 Drawing Sheets

(56) References Cited

U.S. PATENT DOCUMENTS

| | | | | |
|---|---|---|---|---|
| 6,474,826 B1* | 11/2002 | Tanaka | G02B 6/0018 | 362/23.16 |
| 6,832,840 B2* | 12/2004 | Masuda | G02F 1/133502 | 362/19 |
| 6,847,424 B2* | 1/2005 | Gotoh | G02F 1/133615 | 349/113 |
| 7,073,933 B2* | 7/2006 | Gotoh | G02B 6/0016 | 362/23.09 |
| 7,360,939 B2 | 4/2008 | Sugiura | | |
| 7,364,343 B2 | 4/2008 | Keuper et al. | | |
| 7,654,722 B2 | 2/2010 | Chen et al. | | |
| 8,189,973 B2 | 5/2012 | Travis et al. | | |
| 2001/0019379 A1* | 9/2001 | Ishihara | G02B 6/0018 | 349/65 |
| 2001/0024253 A1* | 9/2001 | Ishihara | G02F 1/133615 | 349/113 |
| 2002/0057561 A1* | 5/2002 | Niida | G01D 11/28 | 362/615 |
| 2003/0025852 A1* | 2/2003 | Ishitake | G02B 6/0038 | 349/62 |
| 2003/0063235 A1* | 4/2003 | Nakaoka | G02B 6/0016 | 349/65 |
| 2003/0099117 A1* | 5/2003 | Nakaoka | G02B 6/0021 | 362/561 |
| 2003/0160911 A1* | 8/2003 | Kano | G02B 6/0028 | 349/65 |
| 2004/0012732 A1* | 1/2004 | Sugiura | G02B 6/0038 | 349/65 |
| 2004/0218114 A1* | 11/2004 | Lee | G02B 6/0038 | 349/65 |
| 2004/0257795 A1* | 12/2004 | Yamamoto | G02B 6/0038 | 362/606 |
| 2005/0024849 A1* | 2/2005 | Parker | F21V 5/00 | 362/600 |
| 2005/0024890 A1* | 2/2005 | Yamamoto | G02B 6/0038 | 362/555 |
| 2005/0036083 A1* | 2/2005 | Hayashi | B29C 59/046 | 349/63 |
| 2005/0213350 A1* | 9/2005 | Tsuda | G02B 6/0013 | 362/620 |
| 2006/0146573 A1* | 7/2006 | Iwauchi | G02B 6/0018 | 362/621 |
| 2007/0104415 A1* | 5/2007 | Sugiura | G02B 6/0038 | 385/14 |
| 2007/0127266 A1* | 6/2007 | Sugiura | G02B 6/0038 | 362/615 |
| 2009/0196066 A1* | 8/2009 | Masuda | G02B 6/0078 | 362/561 |
| 2009/0207344 A1* | 8/2009 | Ono | G02B 6/0038 | 349/65 |
| 2009/0316433 A1* | 12/2009 | Shim | G02B 6/0038 | 362/613 |
| 2010/0135041 A1* | 6/2010 | Niu | G02B 6/0036 | 362/627 |
| 2010/0187975 A1* | 7/2010 | Tsukahara | G02B 6/0038 | 313/503 |
| 2011/0096564 A1* | 4/2011 | Shin | G02B 6/0061 | 362/607 |
| 2013/0148055 A1* | 6/2013 | Chen | G02B 6/0038 | 349/62 |
| 2013/0286679 A1* | 10/2013 | Chen | G02B 6/0053 | 362/607 |

FOREIGN PATENT DOCUMENTS

| | | |
|---|---|---|
| CN | 1438526 | 8/2003 |
| CN | 102349006 | 2/2012 |
| CN | 102449509 | 5/2012 |
| CN | 102483522 | 5/2012 |
| CN | 202613213 | 12/2012 |
| KR | 20060042607 | 5/2006 |
| TW | I262458 | 9/2006 |
| TW | 201020638 | 6/2010 |
| TW | I356204 | 1/2012 |
| WO | 2012037035 | 3/2012 |

* cited by examiner

PLANAR LIGHT SOURCE

CROSS-REFERENCE TO RELATED APPLICATION

This application claims the priority benefit of China application serial no. 201310243997.9, filed on Jun. 19, 2013. The entirety of the above-mentioned patent application is hereby incorporated by reference herein and made a part of this specification.

BACKGROUND

Technical Field

The invention relates to a light source. Particularly, the invention relates to a planar light source.

Related Art

Since liquid crystal displays (LCDs) are non-self-luminous displays, a backlight module is required to provide required light to implement a display function. Along with enhancement of environmental awareness, light-emitting devices used in the backlight module are gradually changed from cold cathode fluorescent lamps (CCFLs) to more environmental friendly light-emitting diode (LED) elements. When the LED elements are applied to the backlight module, taking a side-light type backlight module as an example, the LED elements are generally disposed on a bar-shaped printed circuit board to form an LED light bar, and the LED light bar is electrically connected to a control circuit board through a flexible printed circuit (FPC).

FIG. 1 is a top view of a conventional planar light source, and FIG. 2 is a cross-sectional view of the planar light source of FIG. 1 along a section line I-I'. Referring to FIG. 1 and FIG. 2, the conventional planar light source 100 includes a light guide plate 110 and a light source device 120. The light guide plate 110 has a light exiting surface 112, a light incident surface 114 connected to the light exiting surface 112, and a bottom surface 116 opposite to the light exiting surface 112, wherein the light exiting surface 112 includes a peripheral area 112a connected to the light incident surface 114 and a active illumination area 112b. A plurality of printed dots 116a are distributed on the bottom surface 116 of the light guide plate 110, and light emitting uniformity of the light exiting surface 112 could be adjusted by adjusting a distribution density of the printed dots 116a. The light source device 120 is disposed beside the light incident surface 114, and the light source device 120 includes a circuit board 122 and a plurality of LED elements 124, wherein the LED elements 124 are disposed on the circuit board 122 and are electrically connected to the circuit board 122. A light beam L emitted from the LED element 124 enters the light guide plate 110 through the light incident surface 114, and is propagated in the light guide plate 110, wherein a part of the light beam L is scattered by the printed dots 116a on the bottom surface 116 to leave the light guide plate 110 through the light exiting surface 112.

As shown in FIG. 1, in the light source device 120, a pitch between any two adjacent LED elements 124 is P, and a shortest distance between a light emitting surface of each LED element 124 and an edge of the active illumination area 112b is A. In order to uniform a brightness of the active illumination area 112b, the manufacturer determines an optimal A/P ratio according to a beam divergence angle α of the LED element 124. The higher the A/P ratio is, the better the light uniformity is. However, the LCDs are gradually developed towards a trend of slim border, to cope with the design requirement of slim border, the shortest distance A has to be decreased, and when the A/P ratio is excessively low, the active illumination area 112b close to the light incident surface 114 may have bright-dark alternated hot spots, and shadows in FIG. 1 are areas with lower brightness. The hot spots could be eliminated by decreasing the pitch P. However, when the pitch P is decreased, the manufacturer has to use more number of the LED elements 124, which increases the cost.

Therefore, it is important for technicians of the field to resolve the aforementioned hot spot issue under premises of not increasing the manufacturing cost and complying with the design requirement of slim border.

Moreover, Taiwan Patent No. TWI262458 and U.S. Pat. No. 7,364,343B2 disclose that the light source is disposed at a thinner side of a wedge-shaped translucent material light emitting panel. China Patent Publication No. CN102449509A discloses that a side-mounted light source is disposed at a thinner side of a wedge-shaped light guide, and a thicker side of the wedge-shaped light guide has a reflective coating. China Patent Publication No. CN102483522A and U.S. Pat. No. 8,189,973B2 disclose that the light source is disposed at a thinner end of an optical wedge, and a thicker end of the optical wedge has a reflector, and the reflector is bended with a radius of curvature having a center of curvature. U.S. Pat. No. 7,360,939B2 discloses that a light beam emitted from a front light source (light guide plate) passes through an LCD, and is reflected by a reflective film and passes through the LCD, wherein the light guide plate has a plurality of first grooves and second grooves. U.S. Pat. No. 7,654,722B2 discloses that a plurality of V-shaped reflective structures are configured on a reflective surface of a light guide plate. Taiwan Patent No. TWI356204 discloses that two oval light incident structures of different sizes are formed on a light incident surface of a light guide plate. U.S. Pat. No. 6,254,245B1 discloses that a side light source is disposed at a thinner side of a light guide plate. China Patent Publication No. CN102349006A discloses that a plurality of light guide portions are disposed at multiple segments of light guides and have a plurality of reflectors. Taiwan Patent Publication No. TW201020638 discloses that light beams sent by light-emitting components are emitted in parallel, and the light beams are propagated to a curved surface of a reflective device and are incident to a light incident surface of the light guide plate after at least one reflection.

SUMMARY

The invention is directed to a planar light source having a good light uniformity.

Other objects and advantages of the invention can be further illustrated by the technical features broadly embodied and described as follows.

In order to achieve at least one of the objects or other objects, the invention provides a planar light source including a light guide plate and a light source device. The light guide plate includes a plate portion and at least one prism portion. The plate portion has a light incident surface, a reflective surface opposite to the light incident surface, a bottom surface, and a light exiting surface opposite to the bottom surface, wherein the light incident surface and the reflective surface are respectively connected to the bottom surface and the light exiting surface, and a height of the light incident surface, a height of the reflective surface, and a thickness of the plate portion are substantially the same. Moreover, the prism portion is disposed on the bottom surface of the plate portion, wherein the prism portion has a first plane and a second plane, the first plane adjoins the second plane, an included angle between the first plane and the bottom surface is smaller than an included angle between the second plane and the bottom surface, and a shortest distance between the first plane and the light incident surface is smaller than a shortest distance between the second plane and the light incident surface. The light source device is disposed adjacent to the light incident surface.

In an embodiment of the invention, the planar light source further includes a light-shielding material or a light-absorbing material, and the light-shielding material or the light-absorbing material is adhered to the second plane.

In an embodiment of the invention, an area of the first plane is greater than an area of the second plane.

In an embodiment of the invention, a distance exists between the second plane and the reflective surface.

In an embodiment of the invention, the distance is a part of the bottom surface, and a length of the distance is smaller than a length of the prism portion on the bottom surface along a direction from the light incident surface towards the reflective surface.

In an embodiment of the invention, a plurality of printed dots or micro-structures are disposed on the distance.

In an embodiment of the invention, the included angle between the first plane and the bottom surface is between 0 and 30 degrees, and the included angle between the second plane and the bottom surface is between 0 and 90 degrees.

In an embodiment of the invention, the number of the at least one prism portion is plural, and the prisms from the reflective surface towards the light incident surface have the included angles between the first plane and the bottom surface gradually decreased.

In an embodiment of the invention, the reflective surface includes a curved surface.

In an embodiment of the invention, the reflective surface includes a plurality of planes.

In an embodiment of the invention, the reflective surface includes a roughened surface.

In an embodiment of the invention, the light incident surface is parallel to the reflective surface, and the light incident surface is parallel to an extending direction of the light source device.

In an embodiment of the invention, the light guide plate further includes a reflective coating, and the reflective coating is disposed on the reflective surface.

In an embodiment of the invention, the light guide plate further includes a reflector, and the reflector is disposed on the reflective surface.

In an embodiment of the invention, the planar light source further includes a bottom reflection plate disposed under the prism portion.

In an embodiment of the invention, the planar light source further includes at least one optical film disposed above the light exiting surface.

In an embodiment of the invention, a relationship between a thickness H of the plate portion and a thickness H3 of a thickest part of the light guide plate along a direction is $1 < H3/H \leq 10$.

In an embodiment of the invention, a plurality of optical micro-structures are configured on the light incident surface, the optical micro-structures are at least one of micro-lenses, V-cut structures, a reflective material with a scattering property and a combination thereof.

In an embodiment of the invention, the light source device comprises a plurality of light-emitting diode elements, the reflective material with the scattering property are disposed at intervals between the adjacent light-emitting diode elements.

According to the above descriptions, the embodiment or embodiments of the invention have at least one of the following advantages, through the design of the first plane and the second plane of the prism portion and the design of the reflective surface, a light mixing distance and a light mixing effect of the light beam in the light guide plate are increased, which may effectively mitigate a problem of uneven light mixing and a hot spot issue of the conventional technique to obtain a planar light source having good light uniformity. Moreover, the quantity of the used LED elements is decreased, and it is unnecessary to add an additional light mixing area on the light guide plate, so that the planar light source of the invention satisfies the design requirement of slim border in application of the displays.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
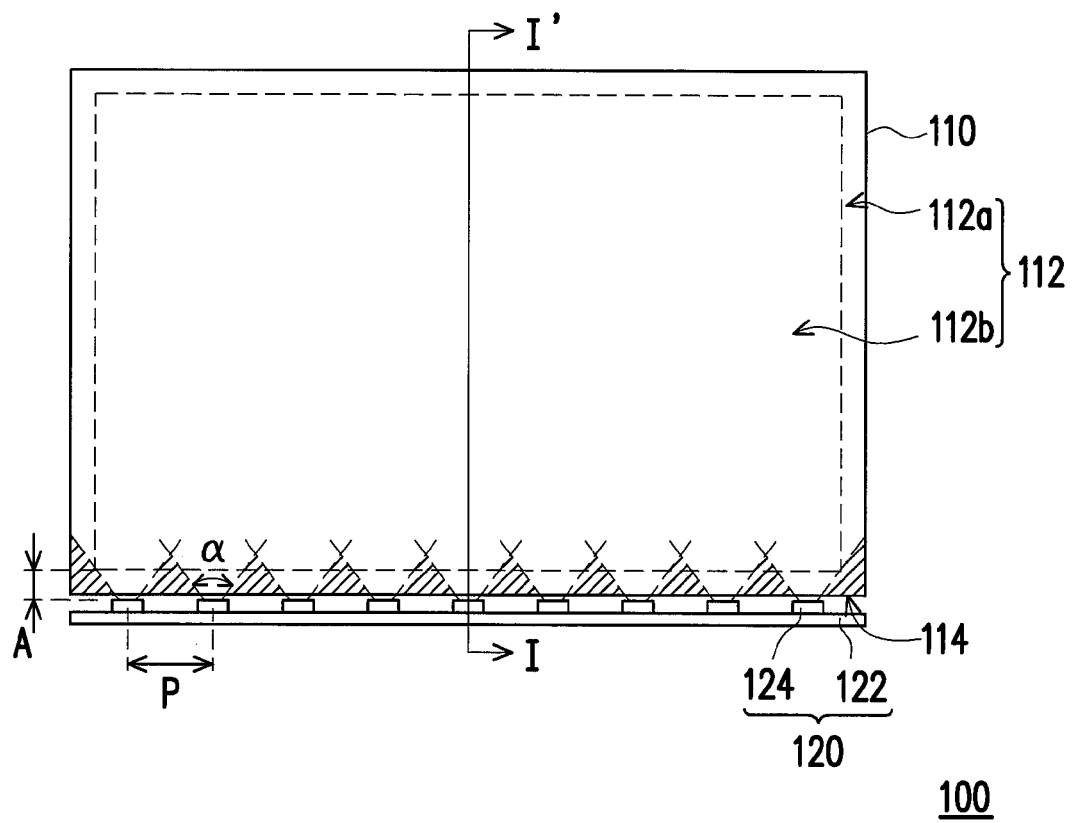
FIG. 1 is a top view of a conventional planar light source.
Figure 2:
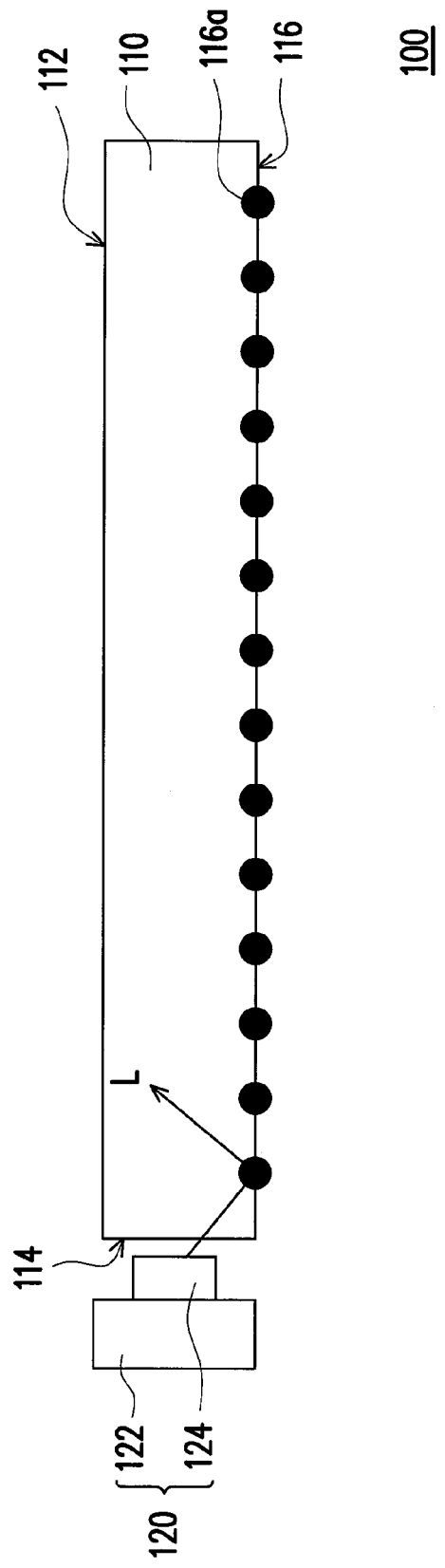
FIG. 2 is a cross-sectional view of the planar light source of FIG. 1 along a section line I-I'.
Figure 3:
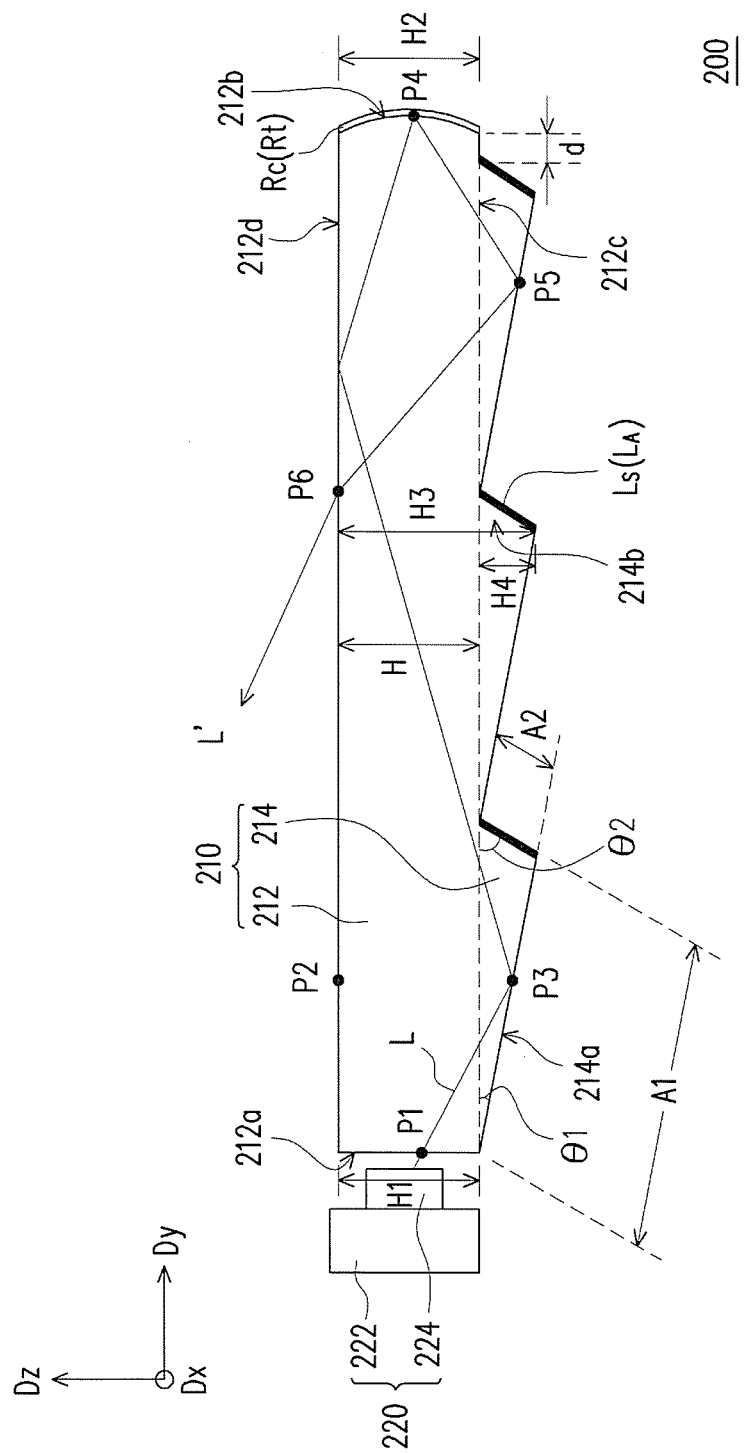
FIG. 3 is a cross-sectional view of a planar light source according to a first embodiment of the invention.

FIG. 3 is a cross-sectional view of a planar light source according to the first embodiment of the invention. Referring to FIG. 3, the planar light source 200 of the embodiment includes a light guide plate 210 and a light source device 220. The light guide plate 210 has a plate portion 212 and at least one prism portion 214 (a plurality of prism portions 214 shown in FIG. 3), wherein the plate portion 212 has a light incident surface 212a, a reflective surface 212b opposite to the light incident surface 212a, a bottom surface 212c, and a light exiting surface 212d opposite to the bottom surface 212c, wherein the light incident surface 212a and the reflective surface 212b are respectively connected to the bottom surface 212c and the light exiting surface 212d. The prism portions 214 are disposed on the bottom surface 212c of the plate portion 212, that is, the prism portions 214 are substantially adjacent to the bottom surface 212c of the plate portion 212, and each of the prism portions 214 has a first plane 214a and a second plane 214b, the first plane 214a adjoins the second plane 214b, wherein an included angle $\theta_1$ between the first plane 214a and the bottom surface 212c is smaller than an included angle $\theta_2$ between the second plane 214b and the bottom surface 212c, and a shortest distance between the first plane 214a and the light incident surface 212a is smaller than a shortest distance between the second plane 214b and the light incident surface 212a. In other words, the shortest distance between the first plane 214a and the light incident surface 212a along a direction Dy is smaller than the shortest distance between the second plane 214b and the light incident surface 212a along the direction Dy. For example, in the embodiment, a direction Dx, the direction Dy, and a direction Dz shown in FIG. 3 correspond to an X-axis, a Y-axis and a Z-axis of a three-dimensional coordinate system, though the invention is not limited thereto. Moreover, the light source device 220 is disposed adjacent to the light incident surface 212a of the plate portion 212. The planar light source 200 of the embodiment could be applied in a backlight source, a front light source of a display, and an illumination system (for example, a cabinet, and cabinet display light).

It should be noticed that the shortest distance between the first plane 214a and the light incident surface 212a is defined as a minimum distance between any point on the first plane 214a and any point on the light incident surface 212a, and the shortest distance between the second plane 214b and the light incident surface 212a is defined as a minimum distance between any point on the second plane 214b and any point on the light incident surface 212a.

In the embodiment, the plate portion 212 and the prism portions 214 of the light guide plate 210 could be fabricated through mold injection, and materials of the plate portion 212 and the prism portions 214 could be the same. In other words, the plate portion 212 and the prism portions 214 thereon are formed integrally. In the embodiment, the material of the light guide plate 210 is, for example, polymethylmethacrylate (PMMA) or other transparent material capable of guiding light.

The light source device 220 is disposed adjacent to the light incident surface 212a of the plate portion 212 along the direction Dx. For example, the light source device 220 of the embodiment is, for example, a light-emitting diode (LED) bar including a circuit board 222 and a plurality of LED elements 224, wherein the LED elements 224 are disposed on the circuit board 222 along the direction Dx, and are electrically connected to the circuit board 222. In other applicable embodiments, besides the aforementioned LED bar, the light source device 220 could also be cold cathode fluorescent tube or other types of light source device, which is not limited by the invention.

Figure 3A:
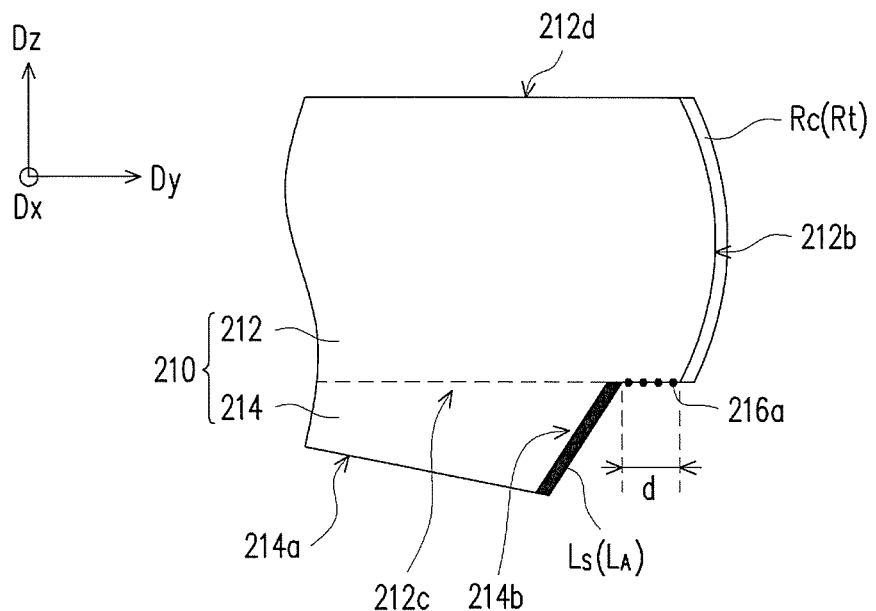
FIG. 3a and FIG. 3b are schematic diagrams respectively illustrating a part of a light guide plate of FIG. 3 at a position close to a reflective surface of the light guide plate.
Figure 3B:
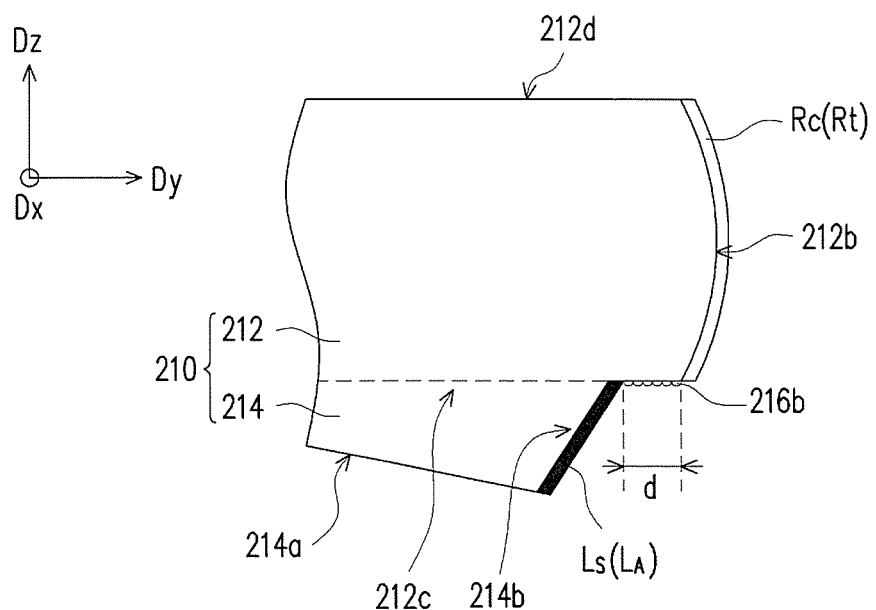

Further, in the embodiment, a distance d exists between the second plane 214b and the reflective surface 212b, wherein the distance d is measured along the direction Dy. In other words, the distance d is a part of the bottom surface 212c. Moreover, a length of the distance d is smaller than a length of the prism portion 214 on the bottom surface 212c along the direction Dy. In addition, light uniformity could be ameliorated by fabrication of printed dots 216a or microstructures 216b on a part of the bottom surface 212c (i.e. the region represented by the symbol "d"), as shown in FIG. 3a or FIG. 3b.

In the embodiment, in order to strengthen reflection efficiency of the reflective surface 212b of the plate portion 212, a reflective coating Rc is disposed on the reflective surface 212b through film plating, or a reflector Rt is disposed on the reflective surface 212b through adherence. Besides the reflective coating Rc and the reflector Rt, in the embodiment, the reflective surface 212b could also be designed into a roughened surface. The reflective surface 212b having the reflective coating Rc, the reflector Rt or the roughened surface could also be applied to other embodiments of the invention, and the invention is not limited thereto.

It should be noticed that a height H1 of the light incident surface 212 of the plate portion 212 along the direction Dz, a height H2 of the reflective surface 212b, and a thickness H of the plate portion 212 are substantially the same, by which a whole thickness of the light guide plate 210 is decreased to implement a thin shape effect. Moreover, the height H1 of the light incident surface 212a, the height H2 of the reflective surface 212b, and the thickness H of the plate portion 212 are allowed to have a tolerance of a certain degree. In other words, the bottom surface 212c of the plate portion 212 is substantially parallel to the light exiting surface 212d. Moreover, a thickness H3 of a thickest part of the light guide plate 210 along the direction Dz is substantially the thickness H of the plate portion 212 plus a thickness H4 of the prism portion 214, and 1<H3/H≤10, which increases a light mixing distance and a light mixing effect of the light beam L in the light guide plate 210. If H3/H<1, the light guide plate 210 is similar to a conventional wedge-shaped light guide plate, and the light beam L cannot be propagated to the reflective surface 212b, and since the light mixing distance is inadequate, light mixing is uneven. If 10<H3/H, the whole thickness of the light guide plate 210 is too thick, and the thin shape effect cannot be implemented.

As shown in FIG. 3, in the invention, the included angle $\theta_1$ is designed to be smaller than the included angle $\theta_2$. When the included angle $\theta_1$ is smaller than the included angle $\theta_2$, most of the light beam L entering the light guide plate 210 through the light incident surface 212a could be smoothly propagated to the reflective surface 212b through total reflections of the first plane 214a and the light exiting surface 212d. Thereafter, the light beam L is reflected back by the reflective surface 212b. Then, the light beam L' reflected by the reflective surface 212b is again reflected by the first plane 214a to leave the light guide plate 210 from the light exiting surface 212d. In this way, the light mixing distance of the light beam L in the light guide plate 210 could be increased to evenly mix the light. It should be noticed that the number of times that the light beam L' reflected by the reflective surface 212b is reflected by the first plane 214a is not limited to be one. In other words, the light beam L' reflected by the reflective surface 212b could be reflected by the first plane 214a for multiple times before the light beam L' leaves the light guide plate 210 from the light exiting surface 212d.

During the process that the light beam L is propagated to the reflective surface 212b from the light incident surface 212a, the light beams L emitted from each of the LED elements 224 are evenly mixed in the light guide plate 210, so that when the light beam L' leaves the light guide plate 210 from the light exiting surface 212d, the problem of uneven light mixing and the hot spot issue are mitigated. Moreover, since the light mixing distance of the light beam L in the light guide plate 210 is increased and the light beam L could be evenly mixed, when the quantity of the LED elements 224 is degreased, the light beam L could also be evenly mixed in the light guide plate 210, so that the quantity of the used LED elements 224 could be decreased. In the embodiment, the included angle $\theta_1$ is, for example, between 0 and 30 degrees, and the included angle $\theta_2$ is, for example, between 0 and 90 degrees.

Figure 3C:
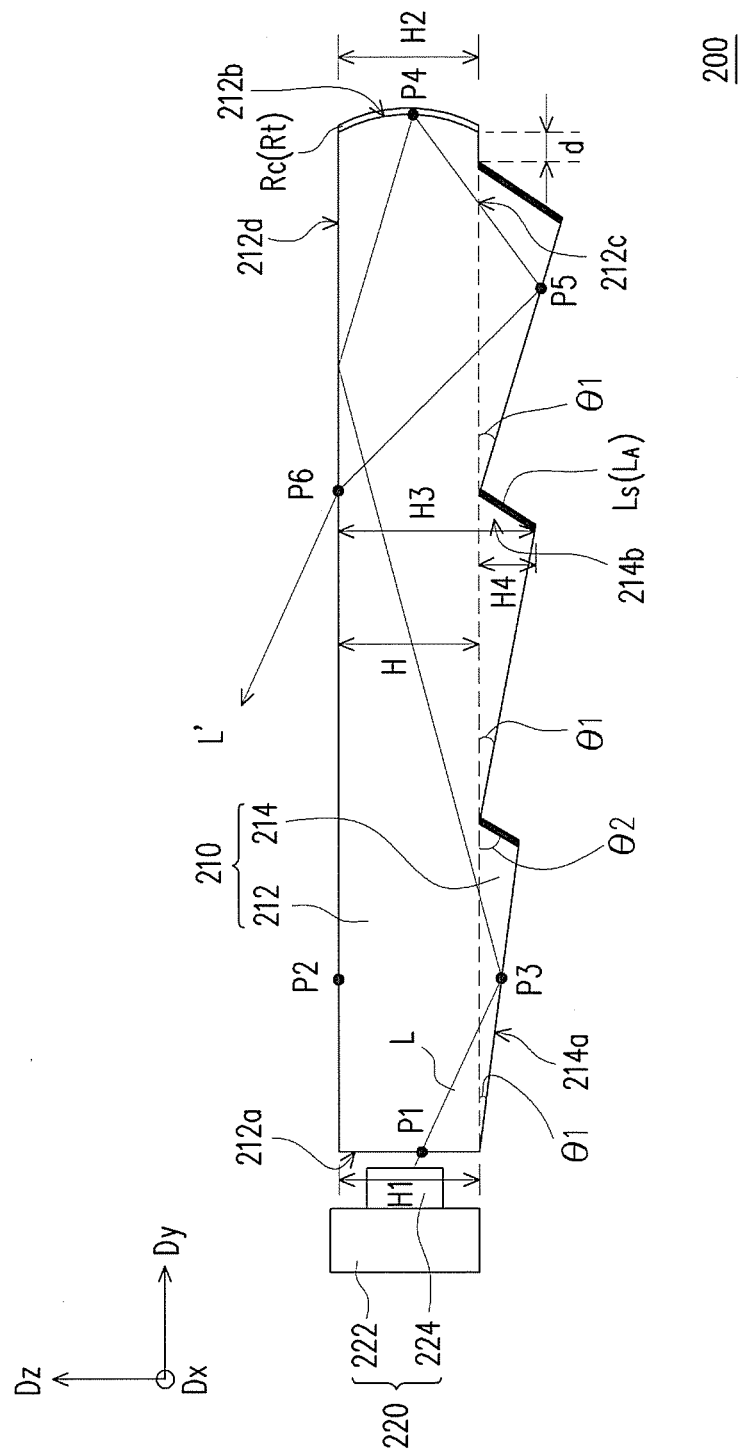
FIG. 3c is a cross-sectional view of a planar light source according to an alternative embodiment of the invention.

Moreover, during the process that the light beam L is propagated to the reflective surface 212b from the light incident surface 212a, a propagating direction of the light beams L gradually approaches to a direction parallel to the light exiting surface 212d, and when the light beam L is reflected by the reflective surface 212b, multiple reflections are probably required to ensure a light incident angle to be smaller than a critical angle θc, so as to emit light from the light exiting surface 212d. Therefore, a light brightness on the light guide plate 210 at a position close to the reflective surface 212b is probably lower. In an embodiment as shown in FIG. 3c, the prism portions 214 from the reflective surface 212b towards the light incident surface 212a have the included angles θ1 gradually decreased to compensate the lower light brightness on the light guide plate 210 at the position close to the reflective surface 212b. The characteristic that the included angles θ1 are gradually decreased from the reflective surface 212b towards the light incident surface 212a could also be applied to the other embodiments of the invention in which at least two first planes 214a are included.

Figure 3D:
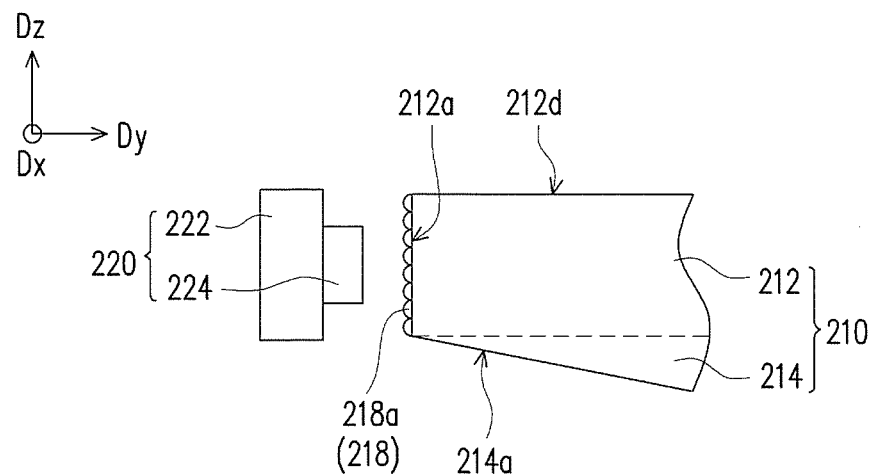
FIGs. 3d-3f are schematic diagrams respectively illustrating a part of the light guide plate of FIG. 3 at a position close to a light source device.
Figure 3E:
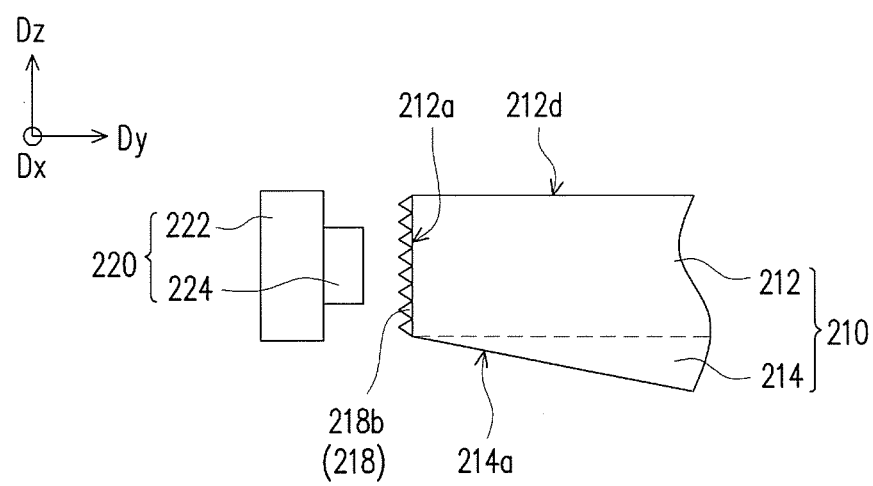
Figure 3F:
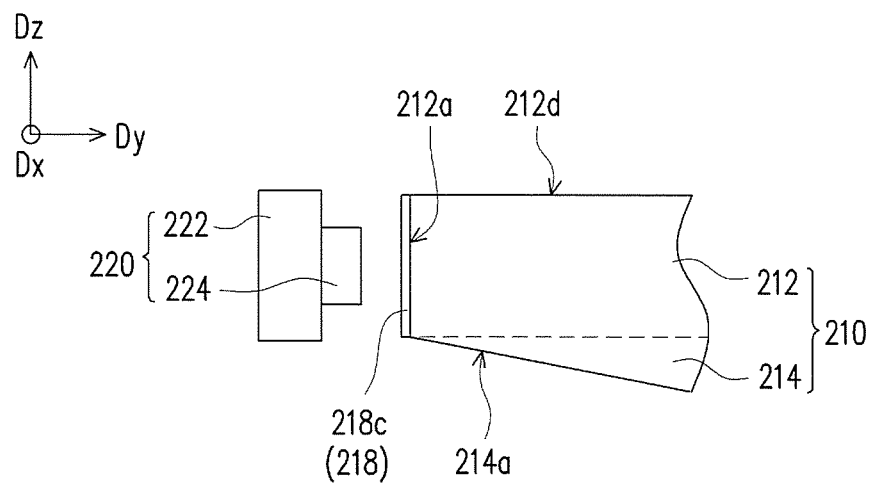
Figure 3G:
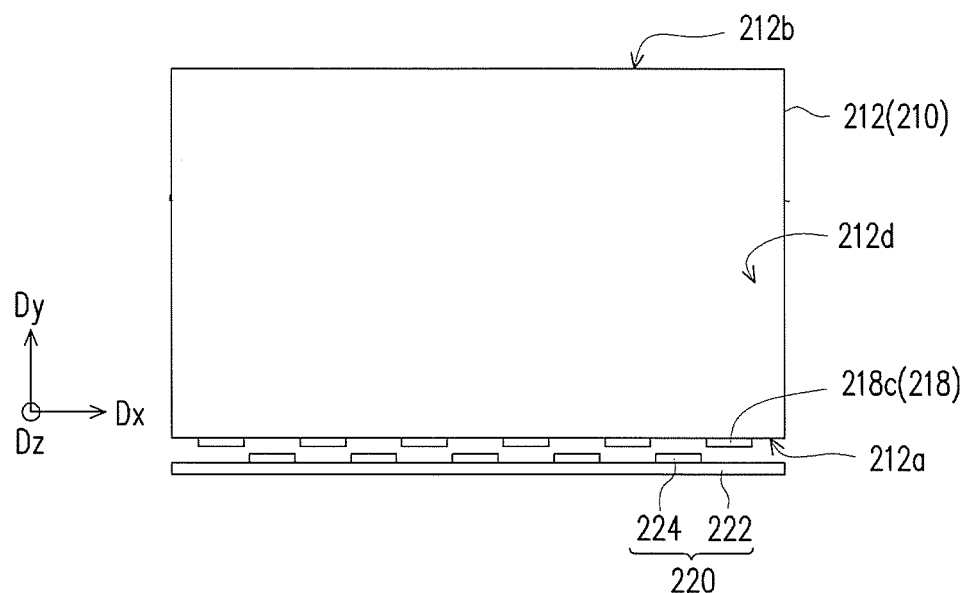
FIG. 3g is a schematic diagram illustrating a reflective material of FIG. 3f being disposed at intervals between adjacent light-emitting diode elements.

In all of the embodiments of the invention, it could be selected whether to perform a special optical treatment on the light incident surface 212a of the plate portion 212, for example, the light incident surface 212a of the light guide plate 210 could be selectively configured with a plurality of optical micro-structures 218, such as micro-lenses 218a (as shown in FIG. 3d), V-cut structures 218b (as shown in FIG. 3e), and a reflective material 218c with a scattering property (as shown in FIG. 3f), etc. For example, the V-cut structure 218b is, for example, configured to the corresponding LED element 224 of the light source device 220 to increase a divergence angle of the light beam L and improve uniformity of the light beam L. In addition, since the used quantity of the LED elements 224 is decreased, the reflective material 218c with the scattering property could be easily disposed at intervals between the adjacent LED elements 224, as shown in FIG. 3g, so as to reflect back the reflected light beam L' to the light guide plate 210 for reuse. Therefore, through the optical micro-structures configured on the light incident surface 212a, a light incident efficiency of the light incident surface 212a is ameliorated to improve the optical performance of the light guide plate 210.

Since the first plane 214a is adjacent to the light incident surface 212a, the shortest distance between the first plane 214a and the light incident surface 212a is 0. In other applicable embodiments, the shortest distance between the first plane 214a and the light incident surface 212a is not 0 (i.e. the first plane 214a is most near but not adjacent to the light incident surface 212a), and those skilled in the art could modify the shortest distance between the first plane 214a and the light incident surface 212a according to an actual design requirement.

As that shown in FIG. 3, an area A1 of the first plane 214a of the embodiment is, for example, greater than an area A2 of the second plane 214b, and when the area A1 of the first plane 214a is greater than the area A2 of the second plane 214b, a reflection efficiency of the light beam L in the light guide plate 210 is increased. It should be noticed that the area A2 of the second plane 214b is the smaller the better, so as to decrease the possibility of light leakage, since the included angle θ1 is not 0, the area A2 of the second plane 214b is not 0. In an applicable embodiment, a light-shielding material $L_S$ or a light-absorbing material $L_A$ could be adhered on the second plane 214b to further mitigate the light leakage phenomenon caused by the second plane 214b, or bright lines caused by the light beam L emitted out of the light guide plate 210 due to reflection of the second plane 214b. Moreover, the light-shielding material and the light-absorbing material are a black material, for example, black ink, Myler or silicon tape.

FIGS. 4A-4F are respectively schematic diagrams of optical behavior at positions P1-P6 of FIG. 3. The light guide plate 210 has a material of polymethylmethacrylate (PMMA), and a refractive index thereof ($n_{LGP}$) is 1.49, and a refractive index of air ($n_{air}$) is 1.00. The following equations are deduced based on the above conditions.

Figure 4A:
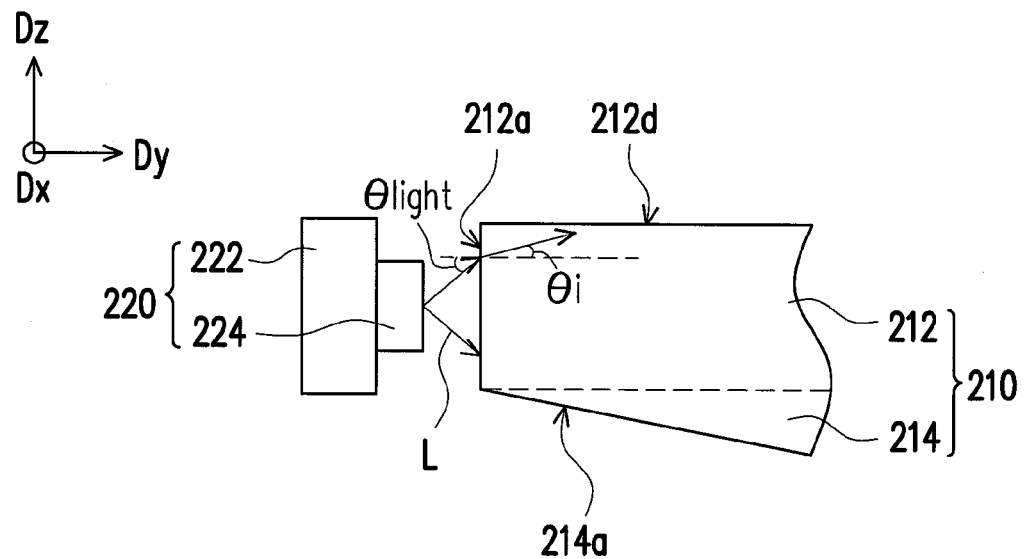
FIGS. 4A-4F are respectively schematic diagrams of optical behaviors at positions P1-P6 of FIG. 3.

Referring to FIGS. 3 and 4A, at the position P1 (only show in FIG. 3), a light incident angle (an included angle $\theta_{light}$) of the light beam L incident to the light incident surface 212a could be between 0° and 90°, and according to Snell's law (equation 1), it is deduced that a refraction angle (an included angle $\theta_i$) is between 0° and 42°.

$$n_{air} \times \sin \theta_{light} = n_{LGP} \times \sin \theta_i \qquad \text{equation (1)}$$

The light beam L is propagated towards the reflective surface 212b after entering the light guide plate 210, and during the propagating process, the light beam L is totally reflected by the first plane 214a and the light exiting surface 212d. Optical behavior at the position P2 (only show in FIG. 3) and the position P3 (only show in FIG. 3) are described with reference of FIG. 4B and FIG. 4C.

Figure 4B:
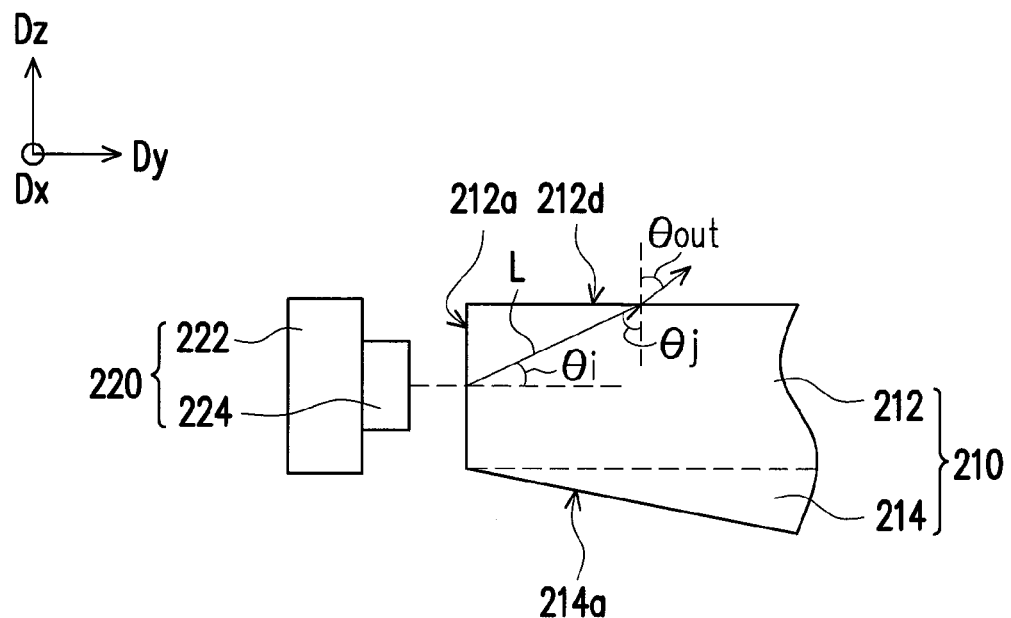

Referring to FIG. 4B, at the position P2 (only show in FIG. 3), since the light exiting surface 212d is substantially perpendicular to the light incident surface 212a, an incident angle (an included angle $\theta_j$) of the light beam L at the light exiting surface 212d is between 48° and 90° (i.e. $\theta_j=90°-\theta_i$), and according to the Snell's law (equation 2), it is deduced that when an included angle $\theta_{out}$ is 90°, the critical angle $\theta_c$ is about 42°. Since the incident angle (the included angle $\theta_j$) is greater than the critical angle $\theta_c$, most of the light beam L is reflected by the light exiting surface 212d to continually propagate in the light guide plate 210, and is further propagated to the reflective surface 212b.

$$n_{air} \times \sin \theta_{out} = n_{LGP} \times \sin \theta_c \qquad \text{equation (2)}$$

Figure 4C:
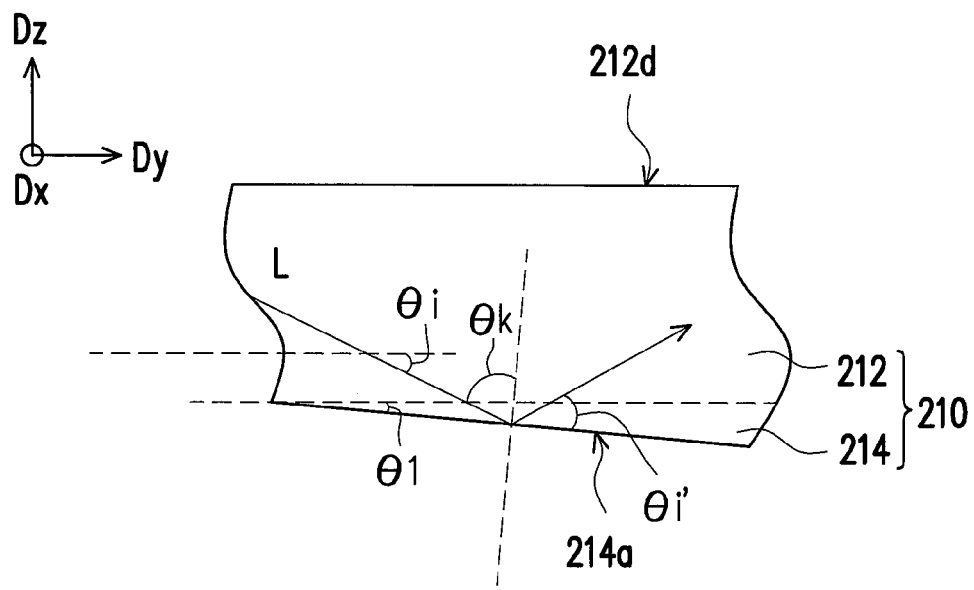

Referring to FIG. 4C, at the position P3 (only show in FIG. 3), a relationship among the included angle $\theta_1$, the included angle $\theta_i$, and an included angle $\theta_{i'}$ is as that shown by an equation 3, and a relationship between the included angle $\theta_{i'}$ and an included angle $\theta_k$ (an incident angle) is as that shown by an equation 4, wherein the included angle $\theta_k$ is an incident angle of the light beam L incident to the first plane 214a, and a relationship among the included angle $\theta_1$, the included angle $\theta_i$, and the included angle $\theta_k$ is as that shown by an equation 5.

$$\theta_{i'} = \theta_i - \theta_1 \qquad \text{equation (3)}$$

$$\theta_k = 90° - \theta_{i'} \qquad \text{equation (4)}$$

$$\theta_k = 90° - \theta_i + \theta_1 \qquad \text{equation (5)}$$

According to the equations 3-5, it is known that the included angle $\theta_k$ is between $(48°+\theta_1)$ and 90°, and since the included angle $\theta_k$ is greater than the critical angle $\theta_c$ ($\theta_c=42°$), most of the light beam L is reflected by the first plane 214a to continually propagate in the light guide plate 210, and is further propagated to the reflective surface 212b.

It is assumed that the light beam L is reflected by the first plane 214a by n times (n>1), now, the incident angle is increased from $\theta_k$ to $\theta_{k'}$, and the incident angle (the included angle $\theta_{k'}$) is as that shown by an equation 6.

$$\theta_{k'} = 90° - \theta_i + n\theta_1 \qquad \text{equation (6)}$$

Obviously, after n times of reflections, the incident angle (the included angle $\theta_{k'}$) is between $(48°+n\theta_1)$ and 90°, so that regardless of the reflection times, the incident angles (the included angle $\theta_{k'}$) are all greater than the critical angle $\theta_c$ ($\theta_c=42°$) of total reflection, and most of the light beam L is still reflected by the first plane 214a to continually propagate in the light guide plate 210, and is further propagated to the reflective surface 212b.

Figure 4D:
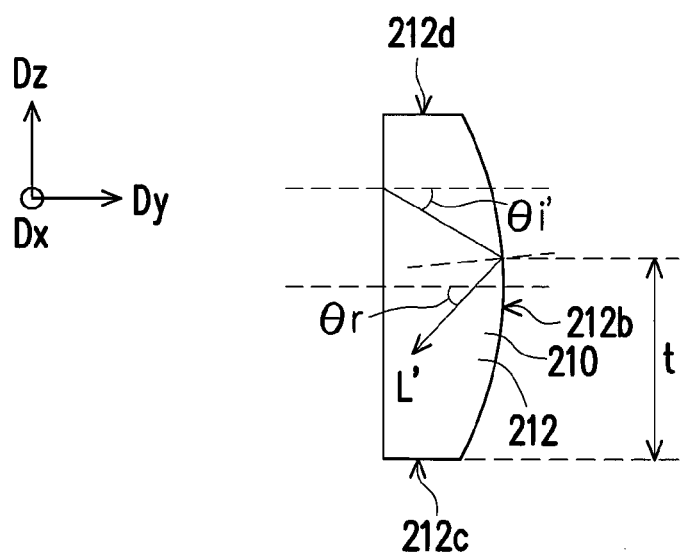

Referring to FIG. 4D, at the position P4 (only show in FIG. 3), it is assumed that the light beam L reflected by the first plane 214a is reflected by the light exiting surface 212d, and is incident to the reflective surface 212b after being reflected by the light exiting surface 212d. Now, an included angle between the propagating direction of the light beam L and the bottom surface 212c or the light exiting surface 212d is $\theta_{i'}$, and an included angle between the light beam L' reflected by the reflective surface 212b and the bottom surface 212c or the light exiting surface 212d is $\theta_r$.

When the reflective surface 212b is a curved surface, the relationship between the included angle $\theta_r$ and the included angle $\theta_{i'}$ is as that shown by an equation 7-1 and equation 7-2, wherein t is a height of the light beam L incident to the reflective surface 212b, 0<t<H, and R is a radius of curvature of the reflective surface 212b.

$$\theta_r = \theta_{i'} + 2 \sin^{-1}((t-(H/2))/R) \qquad \text{equation (7-1)},$$

when t>H/2

$$\theta_r = \theta_{i'} - 2 \sin^{-1}(((H/2)-t)/R) \qquad \text{equation (7-2)},$$

when t<H/2

Figure 4E:
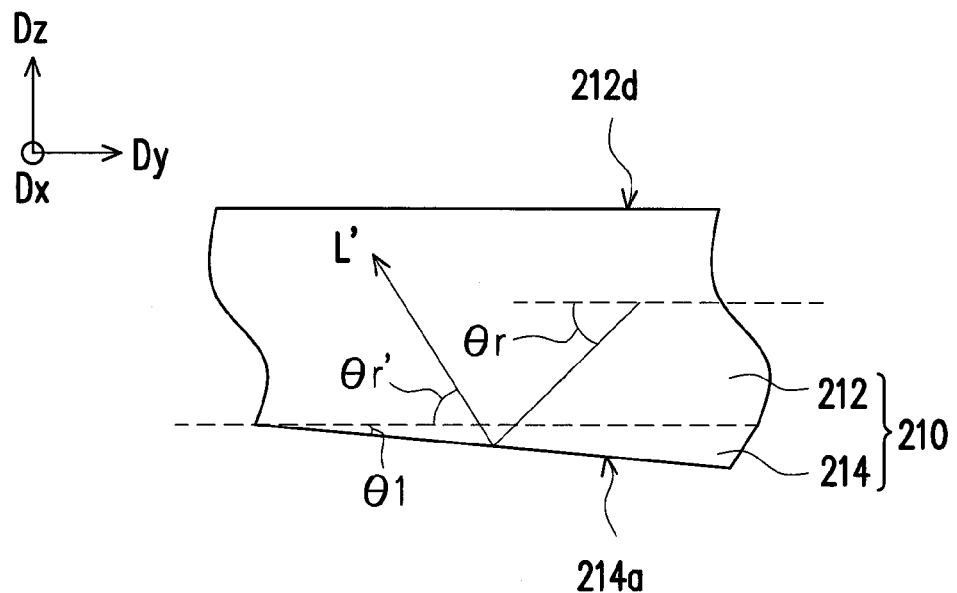

Referring to FIG. 4E, the light beam L' reflected by the reflective surface 212b is propagated to the first plane 214a. At the position P5 (only show in FIG. 3), the included angle between the light beam L' reflected by the reflective surface 212b and the bottom surface 212c or the light exiting surface 212d is $\theta_r$, and an included angle between a propagating direction of the light beam L' reflected by the first plane 214a and the bottom surface 212c or the light exiting surface 212d is $\theta_{r'}$, and the relationship among the included angle $\theta_1$, the included angle $\theta_r$, and the included angle $\theta_{r'}$ is as that shown by an equation 8.

$$\theta_{r'} = \theta_r + 2\theta_1 \qquad \text{equation (8)}$$

It is assumed that the light beam L' reflected by the reflective surface 212b is reflected by the first plane 214a by n times (n>1), now, the incident angle is increased from $\theta_{r'}$ to $\theta_{r''}$, and the incident angle $\theta_{r''}$ is as that shown by an equation 9.

$$\theta_{r''} = \theta_r + 2n\theta_1 \qquad \text{equation (9)}$$

Figure 4F:
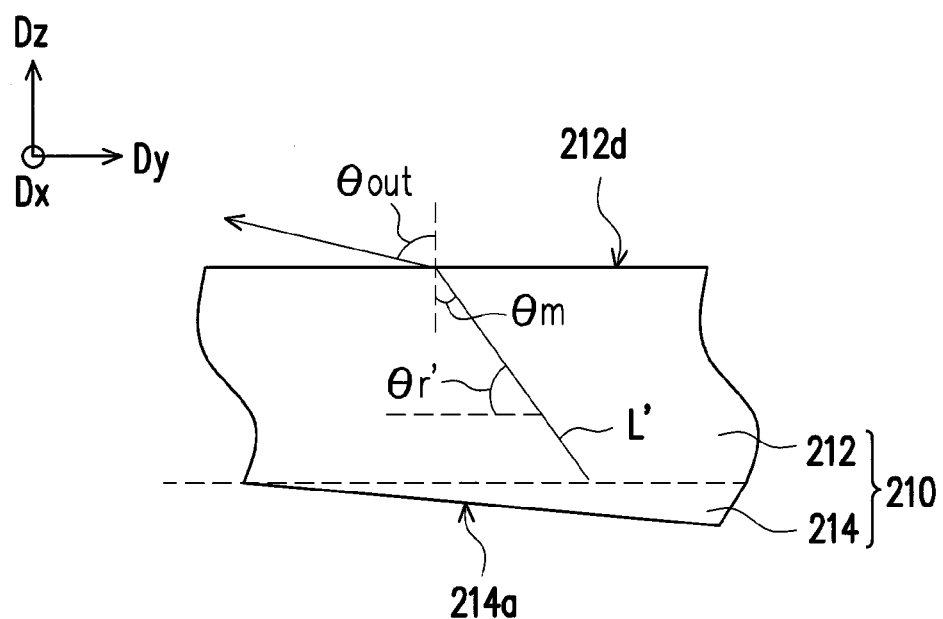

Referring to FIG. 4F, the light beam L' reflective by the first plane 214a for one or more times is propagated to the light exiting surface 212d, and at the position P6, an incident angle of the light beam L' incident to the light exiting surface 212d is an included angle $\theta_m$, and a relationship between the included angle $\theta_m$ and the included angle $\theta_{r'}$ is as that shown by an equation 10.

$$\theta_m = 90° - \theta_{r'} \qquad \text{equation (10)}$$

When the incident angle (the included angle $\theta_m$) is smaller than the critical angle $\theta_c$ (0°≤$\theta_m$<42°) the light beam L' could leave the light guide plate 210 from the light exiting surface 212d. In other words, when the included angle $\theta_{r'}$ is greater than or equal to 48° (48°≤$\theta_{r'}$<90°), the light beam L' could leave the light guide plate 210 from the light exiting surface 212d. The more times the light beam L' is reflected by the first plan 214a, the higher chance the light beam L' leaves the light guide plate 210 from the light exiting surface 212d.

According to the aforementioned optical behaviors at the positions P1-P6, it is known that most of the light beam L in the light guide plate 210 is reflected by the first plane 214a and the light exiting surface 212d for propagating to the reflective surface 212b. Obviously, the light beam L entered the light guide plate 210 could be sufficiently mixed between the light incident surface 212a and the reflective surface 212b. Then, the light beam L' reflected by the reflective surface 212b and the first plane 214a of the prism portion 214 leaves the light guide plate 210 through the light exiting surface 212d.

Figure 5:
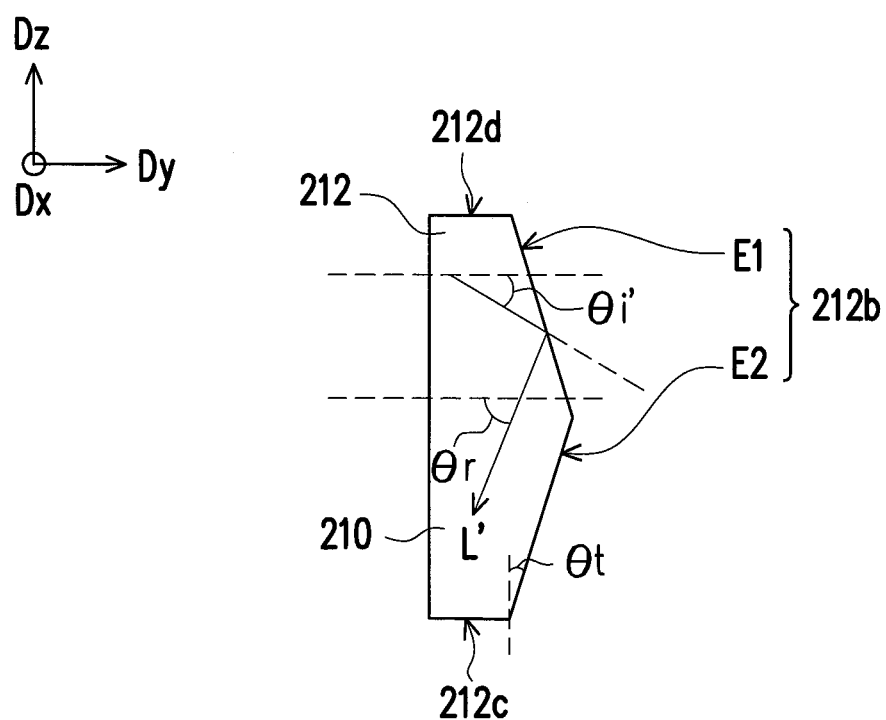
FIG. 5 is a cross-sectional view of another reflective surface according to the first embodiment of the invention.

FIG. 5 is a cross-sectional view of another reflective surface according to the first embodiment of the invention. Referring to FIG. 5, besides that the reflective surface 212b of the embodiment could be designed into a curved surface, the reflective surface 212b may also include two or more planes. In FIG. 5, the reflective surface 212b is composed of two symmetric planes E1 and E2, wherein an included angle between the plane E2 and the bottom surface 212c is $(90°+\theta_t)$, and definitions of the included angle $\theta_i$, and the included angle $\theta_r$ are as that described above, which are not repeated. A relationship among the included angle $\theta_t$, the included angle $\theta_i$, and the included angle $\theta_r$ is as that shown by an equation 11.

$$\theta_r = \theta_i + 2\theta_t \quad \text{equation (11)}$$

When $\theta_r > (n \times \theta_1)/2$, the light beam L' could leave the light guide plate 210 from the light exiting surface 212d. In another embodiment, when a length of the light guide plate 210 along the direction Dy (which is about equal to a distance between the light incident surface 212a and the reflective surface 212b) is 205 mm, and a thickness H thereof along the direction Dz (a distance between the bottom surface 212c and the light exiting surface 212d) is 0.8 mm–1.8 mm, the light beam L' is reflected by the first plane 214a and the light exiting surface 212d for about 46 times, the included angle $\theta_t$ is at least greater than 12.9°.

The reflective surface 212b is not limited to include the two symmetric planes E1 and E2, which may also include a plurality of symmetric or asymmetric planes. Further, a light output amount of the light beam L' at the light exiting surface 212d could be adjusted through asymmetric planes of the reflective surface 212b.

In following embodiments, the same or similar reference numbers denote the same or like components, and descriptions thereof are not repeated.

Second Embodiment

Figure 6:
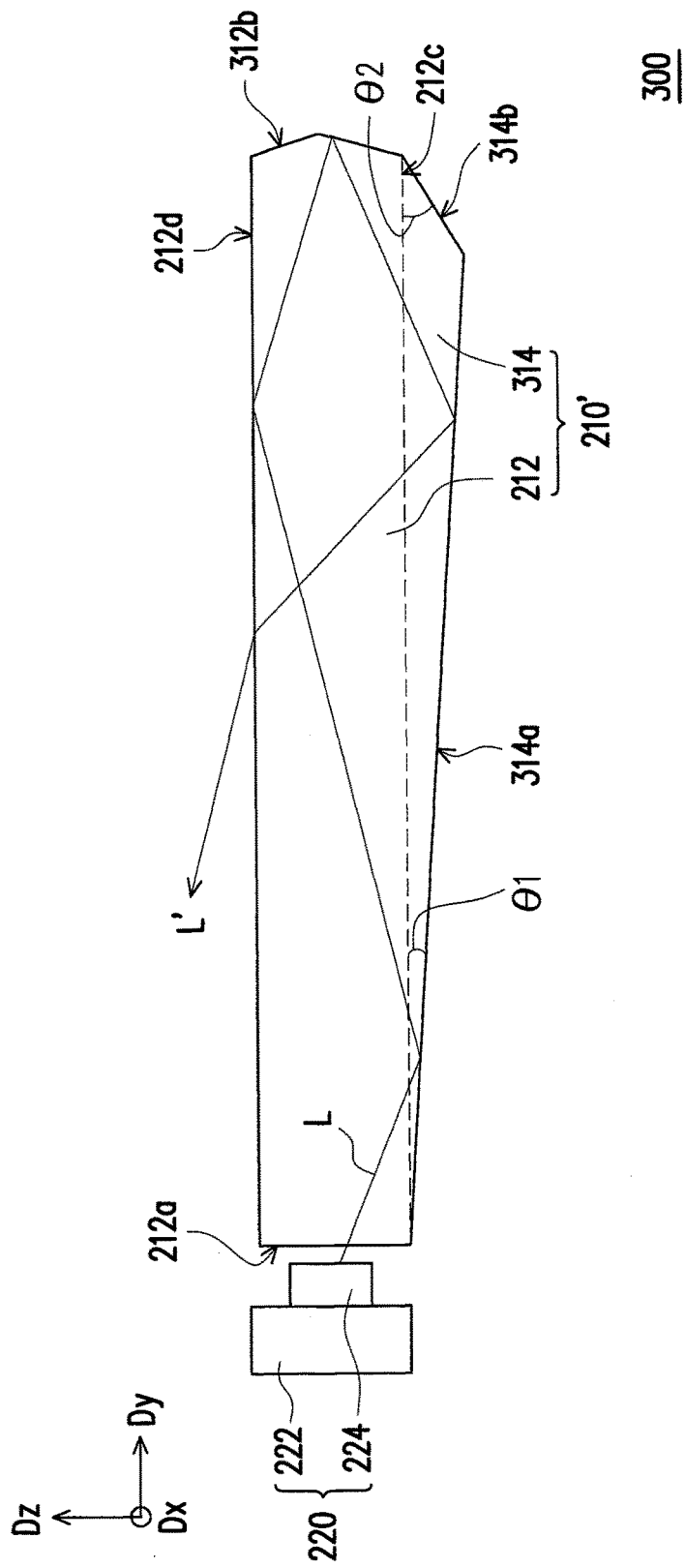
FIG. 6 is a cross-sectional view of a planar light source according to a second embodiment of the invention.

FIG. 6 is a cross-sectional view of a planar light source according to the second embodiment of the invention. Referring to FIG. 6, the planar light source 300 of the embodiment is similar to the planar light source 200 of the first embodiment, and a difference there between is that the reflective surface 312b of the embodiment applies a design similar to that of FIG. 5, and the light guide plate 210' of the embodiment has a single prism portion 314, wherein the prism portion 314 has a first plane 314a and a second plane 314b, and a distance d between the second plane 314b and the reflective surface 312b is 0.

Third Embodiment

Figure 7:
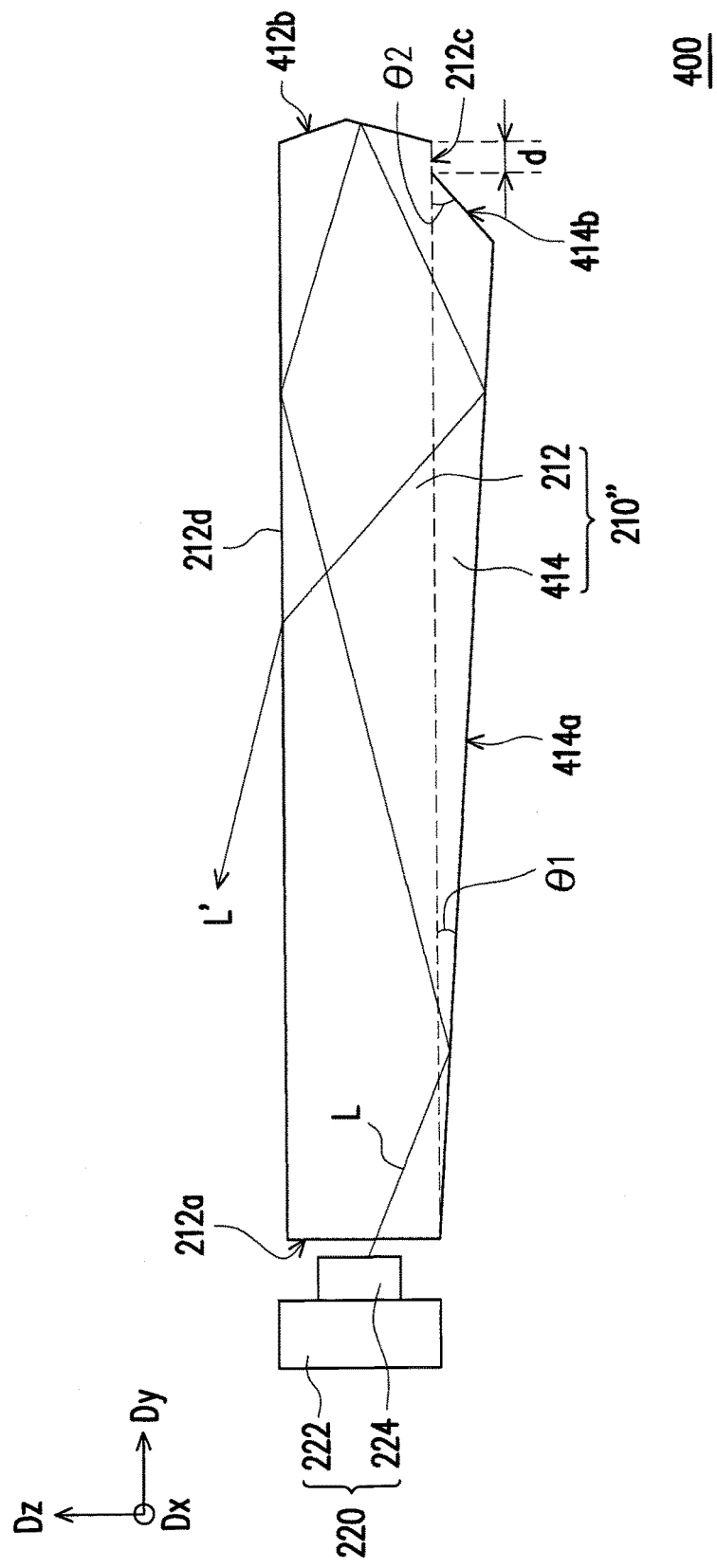
FIG. 7 is a cross-sectional view of a planar light source according to a third embodiment of the invention.

FIG. 7 is a cross-sectional view of a planar light source according to the third embodiment of the invention. Referring to FIG. 7, the planar light source 400 of the embodiment is similar to the planar light source 300 of the second embodiment, and a difference there between is that the light guide plate 210" of the embodiment has a single prism portion 414, and the prism portion 414 has a first plane 414a and a second plane 414b, and the distance d between the second plane 414b and the reflective surface 412b is not equal to 0. For example, the length of the distance d is smaller than a length of the prism portion 414 on the bottom surface 212c along the direction Dy.

Fourth Embodiment

Figure 8:
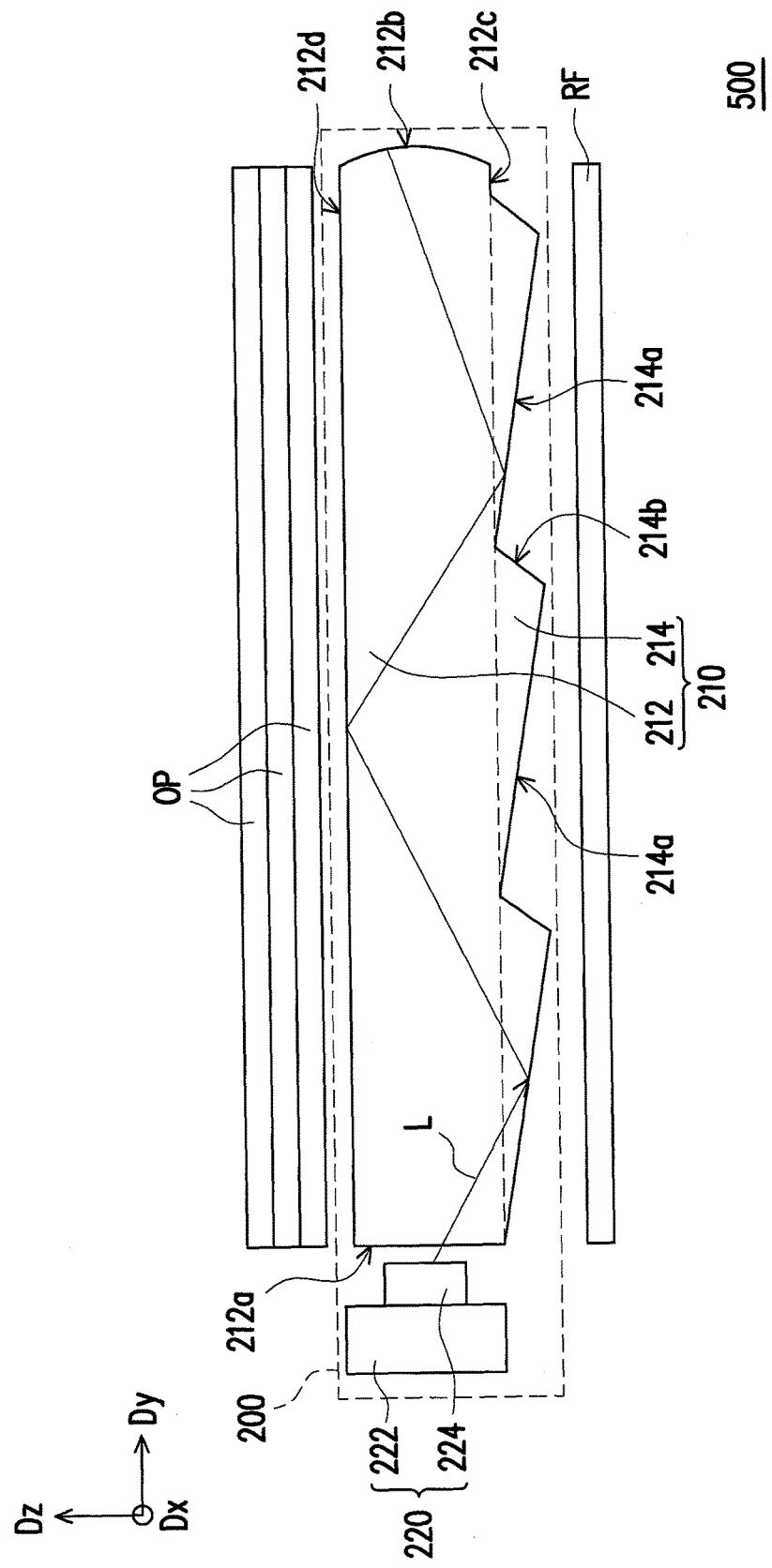
FIG. 8 is a cross-sectional view of a planar light source according to a fourth embodiment of the invention.

FIG. 8 is a cross-sectional view of a planar light source according to the fourth embodiment of the invention. Referring to FIG. 8, the planar light source 500 of the embodiment is similar to the planar light source 200 of the first embodiment, and a difference there between is that the planar light source 500 of the embodiment further includes a bottom reflection plate RF and at least one optical film OP (three optical films OP shown in FIG. 8), wherein the bottom reflection plate RF is disposed under the light guide plate 210 (i.e. under the prism portion 214), and the optical films OP are disposed above the light guide plate 210 (i.e. above the light exiting surface 212d), and the light beam L emits out of the light guide plate 210 through the light exiting surface 212d.

In the embodiment, the bottom reflection plate RF could effectively mitigate light leakage of the light beam L from the bottom of the light guide plate 210, and reflect the light beam L to the light guide plate 210 for reuse, and the optical films OP could further optimise light emitting performance of the planar light source 500. For example, the optical films OP are, for example, diffusers, prisms or a combination thereof. In an exemplary embodiment, the optical films OP include an upper diffuser, a lower diffuser and a set of orthogonal prisms, and the set of orthogonal prisms are disposed between the upper diffuser and the lower diffuser.

Moreover, in other embodiments, the bottom reflection plate RF could be disposed above the light guide plate 210 (i.e. above the light exiting surface 212d), and the optical films OP are disposed under the light guide plate 210 (i.e. under the prism portion 214), and the light beam L emits out from the underneath of the light guide plate 210, i.e. the light beam L emits out from the prism portion 214 of the light guide plate 210, which has the same optical effect, though the invention is not limited thereto.

It should be noticed that one of the bottom reflection plate RF and the optical films OP could be selected and configured. Moreover, the bottom reflection plate RF and the optical films OP of the embodiment could also be applied to other embodiments of the invention.

Fifth Embodiment

Figure 9A:
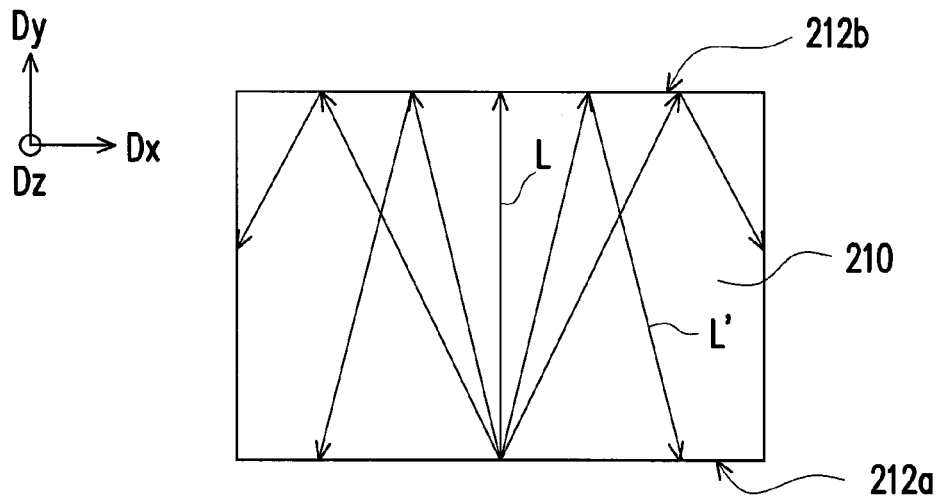
FIGS. 9A-9C are design schematic diagrams of different reflective surfaces according to a fifth embodiment of the invention.
Figure 9B:
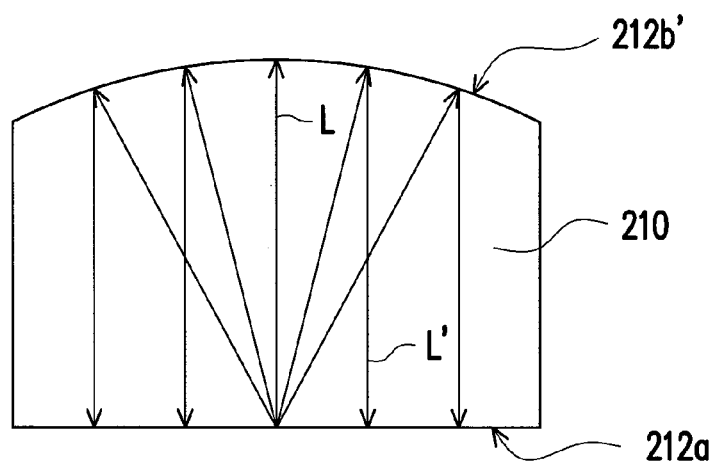
Figure 9C:
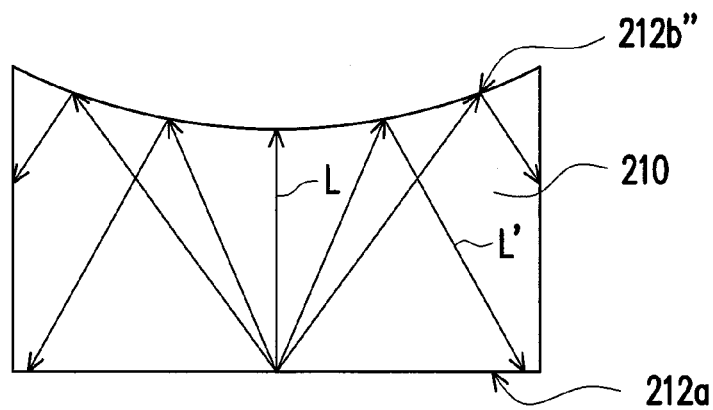

FIGS. 9A-9C are design schematic diagrams of different reflective surfaces according to the fifth embodiment of the invention. Referring to FIG. 9A, the light incident surface 212a and the reflective surface 212b of the light guide plate 210 are parallel to each other and extend along a linear path parallel to the direction Dx. The light incident surface 212a is parallel to the extending direction of the light source device, and the linear path is parallel to the extending direction of the light source device (not shown), and the reflective surface 212b could extend along the linear path (shown in FIG. 9A), or the reflective surfaces 212b' and 212b" extend along the a curve path (shown in FIG. 9B and FIG. 9C). Further, the light guide plate 210 of FIG. 9A is a rectangle in a plane formed by the direction Dy and the direction Dx, and the reflective surface 212b is parallel to the direction Dx. The reflective surface 212b' of the light guide plate 210 of FIG. 9B protrudes out of the light guide plate 210 along the direction Dy, and the reflective surface 212b" of FIG. 9C is recessed into the light guide plate 210 along the direction Dy.

According to different designs of the reflective surfaces 212b, 212b' and 212b", distribution of the light beam L in the light guide plate 210 could be changed, which avails meeting different design requirements. For example, when the light beam L is incident to the reflective surface 212b' of FIG. 9B from the light incident surface 212a, and is reflected back to the light incident surface 212a, the reflected light beams L' are almost parallel to each other, and are more convergent compared to the reflective light beams L' of FIG. 9A. When the light beam L is incident to the reflective surface 212b'' of FIG. 9C from the light incident surface 212a, and is reflected back to the light incident surface 212a, the reflected light beams L' are more divergent, and a degree of divergence thereof is greater than that of the reflected light beams L' of FIG. 9A. Moreover, the design of the reflective surfaces 212b, 212b' and 212b'' of the embodiment could be applied to the other embodiments of the invention, and the invention is not limited thereto.

In summary, the planar light source of the embodiments of the invention has at least one of the following advantages. A light mixing distance and a light mixing effect of the light beam in the light guide plate are increased, which may effectively mitigate a problem of uneven light mixing and a hot spot issue of the conventional technique to obtain a planar light source having good light uniformity. Moreover, the quantity of the used LED elements is decreased, and it is unnecessary to add an additional light mixing area on the light guide plate, so that the planar light source of the invention satisfies the design requirement of slim border in application of the displays.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A planar light source, comprising:
    a light guide plate, comprising:
        a plate portion, having a light incident surface, a reflective surface opposite to the light incident surface, a bottom surface, and a light exiting surface opposite to the bottom surface, wherein the light incident surface and the reflective surface are respectively connected to the bottom surface and the light exiting surface, and a height of the light incident surface, a height of the reflective surface, and a thickness of the plate portion are substantially the same; and
        at least one prism portion, disposed on the bottom surface of the plate portion, wherein the prism portion has a first plane and a second plane, the first plane adjoins the second plane, an included angle between the first plane and the bottom surface is smaller than an included angle between the second plane and the bottom surface, and a shortest distance between the first plane and the light incident surface is smaller than a shortest distance between the second plane and the light incident surface, wherein a distance exists between the second plane and the reflective surface, and the distance is parallel to the light exiting surface, wherein a plurality of printed dots or micro-structures is disposed on the distance;
    a light-absorbing material, directly adhered only to the second plane to mitigate bright lines caused by the light beam emitted out of the light guide plate due to reflection of the second plane; and
    a light source device, disposed adjacent to the light incident surface.

2. The planar light source as claimed in claim 1, wherein an area of the first plane is greater than an area of the second plane.

3. The planar light source as claimed in claim 1, wherein the distance is a part of the bottom surface, and a length of the distance is smaller than a length of the prism portion on the bottom surface along a direction from the light incident surface towards the reflective surface.

4. The planar light source as claimed in claim 1, wherein the included angle between the first plane and the bottom surface is between 0 and 30 degrees, and the included angle between the second plane and the bottom surface is between 0 and 90 degrees.

5. The planar light source as claimed in claim 1, wherein the number of the at least one prism portion is plural, and the prism portions from the reflective surface towards the light incident surface have the included angles between the first plane and the bottom surface gradually decreased.

6. The planar light source as claimed in claim 1, wherein the reflective surface comprises a curved surface.

7. The planar light source as claimed in claim 1, wherein the reflective surface comprises a plurality of planes.

8. The planar light source as claimed in claim 1, wherein the reflective surface comprises a roughened surface.

9. The planar light source as claimed in claim 1, wherein the light incident surface is parallel to the reflective surface, and the light incident surface is parallel to an extending direction of the light source device.

10. The planar light source as claimed in claim 1, wherein the light guide plate further comprises a reflective coating disposed on the reflective surface.

11. The planar light source as claimed in claim 1, wherein the light guide plate further comprises a reflector disposed on the reflective surface.

12. The planar light source as claimed in claim 1, further comprising a bottom reflection plate disposed under the prism portion.

13. The planar light source as claimed in claim 1, further comprising at least one optical film disposed above the light exiting surface.

14. The planar light source as claimed in claim 1, wherein a relationship between a thickness H of the plate portion and a thickness H3 of a thickest part of the light guide plate having the prism portion along a direction is $1 < H3/H \leq 10$.

15. The planar light source as claimed in claim 1, wherein a plurality of optical micro-structures is configured on the light incident surface, the optical micro-structures are at least one of micro-lenses, V-cut structures, a reflective material with a scattering property and a combination thereof.

16. The planar light source as claimed in claim 15, wherein the light source device comprises a plurality of light-emitting diode elements, and the reflective material with the scattering property is disposed at intervals between the adjacent light-emitting diode elements.

* * * * *